UNITED STATES PATENT OFFICE.

HENRY STALAY ARTHUR HOLT, OF LUDWIGSHAFEN, GERMANY, ASSIGNOR TO THE BADISCHE ANILIN AND SODA FABRIK, OF SAME PLACE.

PROCESS OF MAKING NITROBENZALDEHYDE.

SPECIFICATION forming part of Letters Patent No. 661,872, dated November 13, 1900.

Application filed February 6, 1900. Serial No. 4,276. (No specimens.)

*To all whom it may concern:*

Be it known that I, HENRY STALAY ARTHUR HOLT, doctor of philosophy, a subject of the Queen of Great Britain and Ireland, residing at Ludwigshafen-on-the-Rhine, in the Kingdom of Bavaria and Empire of Germany, have invented new and useful Improvements in Processes for the Production of Nitrobenzaldehydes, of which the following is a specification.

My present invention consists in a process for converting ortho- or para-nitro-toluene into the corresponding aldehydes by simply heating the said nitro compounds with manganese peroxid without the addition of an acid. According to this new process a considerable yield of the desired aldehydes is obtained. The process can be carried out in a vessel provided with a stirrer in which the nitro-toluene is heated with finely-divided manganese peroxid and under such conditions that the water produced distils off, or other means may be adopted—for instance, the vapor of a nitro-toluene may be passed over heated manganese peroxid. From the distilled mixture of nitro-toluene and nitro-benzaldehyde obtained in either case the aldehyde can be isolated by treatment with sodium bisulfite in the known way. Unchanged nitro-toluene can be used again in the same way.

The following examples will serve to further illustrate the manner in which the invention is carried into practical effect, the parts being by weight:

Example 1: Prepare a mixture of one hundred (100) parts of ortho-nitro-toluene and sixty (60) parts of manganese peroxid (containing eighty per cent. $MnO_2$) in the condition of a fine powder. Heat the mixture until it boils and maintain the temperature for from one to two hours. Then distil off the oil by means of steam and heat the distillate with an aqueous solution of sodium bisulfite at ordinary temperature. Separate the aqueous solution of the aldehyde bisulfite compound from the oil and regenerate the ortho-nitro-benzaldehyde from the solution of its bisulfite compound by the addition of alkalies.

Example 2: Fill a glass or enameled tube with manganese peroxid and heat it in a bath of molten metal to a temperature of from about 210° to 250° centigrade. At this temperature pass the vapors of ortho-nitro-toluene through the tube, which is furnished with a condenser, so that the reaction product and any unchanged oil are condensed and collected. Work up as described in Example 1.

In an analogous way the corresponding para-nitro-benzaldehyde can be prepared. The manganese peroxid may be powdered native mineral, or regenerated manganese peroxid can be used.

Now what I claim is—

1. The process of making nitro-benzaldehyde by heating nitro-toluene with manganese peroxid substantially as described.

2. The process of making nitro-benzaldehyde by heating liquid nitro-toluene with manganese peroxid substantially as described.

3. The process of making ortho-nitro-benzaldehyde by heating ortho-nitro-toluene with manganese peroxid substantially as described.

In testimony whereof I have hereunto set my hand in the presence of two subscribing witnesses.

HENRY STALAY ARTHUR HOLT.

Witnesses:
ERNEST F. EHRHARDT,
JACOB ADRIAN.